United States Patent [19]

Matsumura et al.

[11] 3,917,747

[45] Nov. 4, 1975

[54] METHOD OF PRODUCING CYCLOPENTENE COPOLYMER

[75] Inventors: Shoichi Matsumura; Hiroshi Wakabayashi; Toru Nakagawa; Shigeru Fujii, all of Kobe, Japan

[73] Assignee: Kanegafuchi Kagaku Kogyo Kabushiki Kaisha, Osaka, Japan

[22] Filed: Aug. 8, 1974

[21] Appl. No.: 495,629

[30] Foreign Application Priority Data
Aug. 11, 1973 Japan.............................. 48-90280

[52] U.S. Cl. ........ 260/879; 260/80.78; 260/88.2 D; 260/88.2 E; 260/93.1; 260/82.1
[51] Int. Cl.$^2$.... C08F 2/06; C08F 4/52; C08F 4/22; C08F 232/04
[58] Field of Search .. 260/93.1, 879, 80.78, 88.2 D, 260/88.2 E, 82.1, 88.2 F

[56] References Cited
UNITED STATES PATENTS

| | | | |
|---|---|---|---|
| 3,707,520 | 12/1972 | Pampus et al. .................... | 260/82.1 |
| 3,772,255 | 11/1973 | Bell................................ | 260/88.2 D |
| 3,816,382 | 6/1974 | Streck et al........................ | 260/93.1 |
| 3,830,877 | 8/1974 | Dall'Asta et al. ................... | 260/879 |
| 3,836,593 | 9/1974 | Streck et al. .................... | 260/88.2 E |

*Primary Examiner*—Joseph L. Schofer
*Assistant Examiner*—J. R. Cervi
*Attorney, Agent, or Firm*—Moonray Kojima

[57] ABSTRACT

A method of producing copolymer of cyclopentene comprising two stages, the first stage comprising polymerization of cycloolefin of more than 7 membered ring which has at least two double bonds in the ring unconjugated to each other, over a catalyst comprising (A) metal compound of tungsten or molybdenum and (B) Lewis acid, and the second stage comprising copolymerization of the above obtained cycloolefin polymer and cyclopentene by adding into the polymerization solution obtained in the first stage, cyclopentene containing inert solvent and (C) organic metallic compound of a metal of Group I to IV of the Periodic Table.

10 Claims, No Drawings

METHOD OF PRODUCING CYCLOPENTENE COPOLYMER

BACKGROUND OF THE INVENTION

This invention relates to method of producing cyclopentene copolymers and to a new type of copolymer of cyclopentene. More particularly, this invention relates to a binary copolymer of cyclopentene and cycloolefin which has at least two double bonds in the ring unconjugated to each other, and a ternary copolymer of cyclopentene, monoolefin and cycloolefin which has at least two double bonds in the ring unconjugated to each other, and to a method of producing same.

Recently, much attention has been focused on ring opening polymerization of cycloolefins, in particular that of cyclopentene which gives 1,5-trans-polypentenamer. It is well known that the polypentenamer, as a new type of elastomer, has a number of desirable features. Especially, it is said that the polypentenamer shows notably high green strength due to its tendency towards crystallization, owing to its essentially "trans" conformation.

It is also well known, however, that the polypentenamer shows high level of green strength only when the Mooney viscosity of the polymer exceeds 100, such as in case of polymerization of cyclopentene by conventional method, for example, by the method disclosed in Japanese Patent Publication No. 7552/1968. The processability of raw rubber in such a case is not satisfactory because of its excessively high Mooney viscosity. Furthermore, a desirable level of green strength can be obtained only if a negligible amount of impurities exists in monomeric cyclopentene where the trans-content of the obtained polymer would be up to 93%. However, there are several impurities in industrially available cyclopentene which bring down the trans content of the obtained polymer far below 93%. For example, even a trace amount of beta olefins such as 2-pentene or 2-methyl-2-butene lowers trans content severely and in turn the green strength is reduced to a low level, such as disclosed in Japanese Unexamined Laid Open Specification No. 11387/1973. It is also readily apparent to the worker skilled in the art that polymerization using cyclopentene free of even trace amounts of impurities, such as beta olefins, is nearly impossible industrially, because of its inhibitively high costs.

Also, it is well known that cyclopentene homopolymer can be prepared over a catalyst system composed of a salt of transition metal such as tungsten or molybdenum and organic aluminum compound, wherein the trans-content of the resulting homopolymer can be controlled by changing the catalyst composition. However, this latter method is not an effective way of obtaining high level of green strength by virtue of high trans-content, because the catalyst composition imparting the high trans-content, would at the same time lower largely the conversion of monomer to polymer.

In the prior art, there are generally two methods of obtaining cyclopentene copolymer, i.e. the widely used method of charging two monomeric species at the time of start of polymerization, and the method of exploiting cross-disproportionating reaction between two polymeric species.

In case of applying the former method to cyclopentene using cyclic polyene such as 1,5-cyclooctadiene or 1,5,9-cyclododecatriene as comonomer, it is difficult to prepare uniform copolymers because of a number of reasons including difference of reactivity by monomer species or in other words different co-ordination ability of tungsten as the catalytic active species. In addition, conversion of cyclopentene into polymer is reduced by addition of comonomer. For example, when 1,5-cyclooctadiene is used as comonomer, its reactivity is high at a temperature above room temperature and is enhanced by the use of strongly Lewis acidic organic aluminum compound such as ethyl aluminum dichloride, while the reactivity of cyclopentene itself is high at temperatures below room temperature (optimally around 0°C) and shows enhanced reactivity over catalyst containing trialkylaluminum. These differences in reactivity show that the catalytic active species are not the same for those two monomers.

On the other hand, in case of applying the other method, i.e. olefin disproportionation of polymer to polymer, there arises a limitation of reaction time so that side reactions will not take place to give low molecular weight degradation product caused by depolymerization reaction, such as described in the examples in Japanese Unexamined Laid Open Specification No. 12383/1973. Furthermore, there is another disadvantage in chemical engineering of this process in mixing and reacting two viscous polymer solutions, which also hinders actual preparation of desired polymer.

SUMMARY OF THE INVENTION

This invention aims to produce a polypentenamer having notably high level of green strength even in case of using cyclopentene contaminated by monomeric impurities such as beta olefins by means of making copolymer with cyclic hydrocarbon having at least two double bonds in the ring unconjugated to each other. This invention also produces cyclopentene copolymer elastomer showing lower heat build-up compared with homopolymer.

By the method of this invention, one can eliminate or reduce the aforementioned problems. Eliminated is the difficulty of reactivity depression accompanied by selection of metallo-organic compounds. Moreover, advantage can be taken of preparing so-called tailor made copolymer having a wide range of copolymer composition and controlled sequence length from random to block type copolymer by controlling charge ratio and conversion in both first and second stages and controlling melecular weight of the intermediate polymer in the first stage.

A typical polymerization procedure according to the invention comprises adding to non-conjugated cyclic polyene compound dissolved in a suitable inert solvent, a predetermined amount of tungsten or molybdenum compound and lewis acid and then polymerizing to a desired level of conversion. In the next stage, a cyclopentene solution is added to the polymerizing solution of the first stage. The mixture is allowed to stand for a time at room temperature, then is cooled to −10° to 0°C, and then copolymerization is started by the addition of an organo mellic compound. On reaching a desired degree of conversion, the resulting polymer is recovered by a known procedure, e.g. addition of a few weight percent amount of polymerization inhibitor, such as alcohol and antioxidant, followed by polymer deposition industrially by hot water treatment, and then dried by several types of dryers.

DETAILED DESCRIPTION OF PREFERRED EMBODIMENTS

As suitable non-conjugated cyclic polyenes, there may be selected 1,5-cyclooctadiene or 1,5,9-cyclododecatriene, etc, although the invention is not limited to these two. The non-conjugated cyclic polyene is favorably used in an amount of 0.1 to 50%, preferably 1 to 30% by weight based on cyclopentene.

The non-conjugated cyclic polyene is subjected to polymerization in a first stage over a catalyst system composed of (A) a metal compound containing tungsten or molybdenum and (B) a Lewis acid. As the metal compound containing tungsten or molybdenum of component (A), there may be used any one or more of such compounds known as olefin disproportionation catalyst, among which $WCl_6$, $WCl_5$, $WOCl_4$, $WO_3$, $WO_2$, $MoCl_5$, and $MoCl_3$, are preferred.

The Lewis acid of component (B) may be selected from $BF_3$, $AlCl_3$, $AlBr_3$, $SnCl_4$, $SiCl_4$, $TiCl_4$, $PCl_3$, etc., among which $AlCl_3$ and $AlBr_3$ are preferred in respect of catalyst activity.

The catalyst system is advantageously prepared by heating and reacting to each other the two components (A) and (B), in advance in respect of catalyst activity. For example, it is preferable to use reaction mixture of tungsten oxide and aluminum chloride as the catalyst which shows high polymerization activity, as disclosed in Japanese Unexamined Laid-Open Specification No. 39599/1973.

The other catalyst component (C), composed of organo metallic compound of a metal from Group I to IV of the Periodic Table and used in the second stage, includes any of known organic lithium compound, organic magnesium compound, organic aluminum compound, organic tin compound and organic silicone compound, among which organic aluminum compound is most desirable in respect of activity. The organic aluminum compound are not limited, but the use of $Al(C_2H_5)_3$, $Al(iso-Bu)_3$, $(C_2H_5)AlCl$ and $C_2H_5AlCl_2$ are preferred, and the use of trialkyl aluminum is most preferred.

The molar ratio between components (A), (B) and (C) can be varied in a wide range, wherein 0.1/1 to 50/1, and more preferably 1/1 to 10/1 for B/A; and 0.1/1 to 10/1 for C/A, will usually suffice, although there is no substantial limitation. The component (A) is used in an amount of 0.1 to 10 millimole percent based on cyclopentene.

The molecular weight of the resulting cyclopentene copolymer can be regulated by controlling the amount of catalyst and the polymerization conditions. It is also effective to molecular weight regulation to copolymerize alpha or beta monoolefin as a third monomeric component. Those alpha monoolefin and beta monoolefin include, for example, ethylene, propylene, 1-butene, 2-butene, 1-pentene, 2-pentene and 1-hexene. A suitable amount of those monoolefins may be selected within a range of 0.01 to 10% by weight based on the weight of cyclopentene.

The copolymerization process of this invention in its first and second stages is carried out in the presence of inert solvent such as aliphatic, alicyclic or aromatic hydrocarbon or halogenated hydrocarbon, for example, cyclohexane, n-hexane, toluene or chlorobenzene. The solvent should be free from catalyst deactivating impurities such as water. The solvent should thus undergo proper purification procedures.

The polymerization temperature may be selected within a range of $-60°$ to $70°C$, more preferably $-30°$ to $30°C$, for both the first and second stages.

In the polymerization procedure of this invention, neither weight ratio of comonomer (non-conjugated cyclic polyene compound) to inert solvent nor molar ratio of comonomer to tungsten or molybdenum compound is specifically limited. However, the weight ratios within the range of 10/1 to 0.01/1 is preferred, and a molar ratio within the range of 50/1 to 10,000/1 is preferred.

The copolymer obtained by this invention has a very high green strength. Advantageously, the copolymer can be used for improvement of pre-vulcanisate strength (green strength) and tackiness of synthetic rubber composition of, for example, general purpose styrenebutadiene rubber, cis-polyisoprene, cis-polybutadiene, ethylenepropylene terpolymer, etc, and can be widely used in the form of vulcanisate for vehicle tires, and other industrial rubber products.

This invention will now be further illustrated by the following actual examples, which examples are not to be construed in any limiting sense.

EXAMPLE 1

Preparation of polymerization catalyst.

Under a moisture-proof nitrogen atmosphere, 10 g (43.2 millimoles) of anhydrous tungsten oxide and 17.3 g (130 millimoles) of aluminum chloride were mixed and pulverized. To the powder 100 ml of chlorobenzene was added, and the mixture was refluxed with condenser at 180°C for 7 hours. After cooling down to room temperature, 95 ml of supernatant liquid was transferred to another flask by a syringe. The thusly obtained catalyst solution had a tungsten content of 0.160 millimole/ml. This catalyst is hereinafter referred to as tungsten catalyst.

Polymerization reaction

Polymerization was carried out in a vessel equipped with nitrogen inlet, sealed opening for syringe and stirrer, and under ultrahigh purity nitrogen atmosphere. First, there was placed 400 ml of moisture free chlorobenzene in the vessel, followed by addition of 1.5 millimole of tungsten catalyst which changed the color of the solution immediately to deep red. The mixture was cooled to $-50°C$ and there was added thereto 40 ml (10% by volume of cyclopentene) of 1,5-cyclooctadiene to start polymerization. Then, the temperature was gradually raised up to 0°C. The solution became viscous after ca. 1 hour's polymerization.

In that stage, 700 ml of anhydrous chlorobenzene and 400 (4.53 moles) of similarly purified anydrous cyclopentene were in turn added to the polymerization solution. The mixture was then cooled to $-10°C$, and polymerization was started by addition of 3.0 millimoles of triisobutyl aluminum. The polymerization was carried on for 5 hours and then was stopped by addition of monoethanolamine. After addition of antioxidant, the polymer was deposited by use of 10 times amount of methanol, whereby rubbery polymer was recovered. The thusly recovered polymer was dried in a vacuum drying oven until constant weight, which gave 248 g of product corresponding to 72.3% conversion. The trans-content was 83% as determined by infra-red (IR) spectrum test and cyclooctadiene content was 8.2 mole %, as determined from NMR measurements. These measurement tests are well known. Hereinafter similar types of tests were used for similar measurements. The Mooney viscosity of raw rubber was found to be 119.

Comparative Example 1

Similarly to Example 1, 30 ml of anhydrous chlorobenzene, 0.278 millimole of tungsten catalyst, 5 ml of cyclopentene and 5 ml of 1,5-cyclooctadiene were put together, allowed to stand at room temperature for a while, and then cooled to 0°C. Polymerization was started by adding 0.556 millimole of triisobutyl aluminum, and carried out for ca. 5 hours. Only a trace amount of copolymer was formed, which had 85.1 % of trans-content and 16.9 mole % of 1,5-cyclooctadiene determined by IR and NMR measurements respectively.

Comparative Example 2.

The procedure of Comparative Example 1 was repeated except using 0.556 millimole of a 1:1 mixture of triisobutyl aluminum and ethyl aluminum dichloride instead of triisobutyl aluminum alone. Only a trace amount of polymer resulted after 5 hours of polymerization, which contained 92.5% of trans-structure and 17.2 mole of cyclooctadiene.

EXAMPLE 2

According to the procedure described in Example 1, first stage polymerization was carried out with 60 ml (15% by volume of cyclopentene) of anhydrous cyclooctadiene in 600 ml of anhydrous chlorobenzene over 1.5 millimole of tungsten catalyst. After ca. 1 hour, second stage polymerization was carried out by adding to the above-obtained mixture 300 ml of chlorobenzene, 400 ml of cyclopentene and 3.0 millimole of triisobutyl aluminum. After ca. 5 hours of copolymerization, 244 g of product was recovered, corresponding to 67% conversion. Trans-content and Mooney viscosity were 84.0% and 80 respectively.

EXAMPLE 3.

According to the procedure described in Example 1, 80 ml of anhydrous 1,5-cyclooctadiene (20% by volume of cyclopentene) was first polymerized in 800 ml of anhydrous chlorobenzene over 1.5 millimoles of tungsten catalyst. After ca. 1 hour there were added thereto 200 ml of anhydrous chlorobenzene, 400 ml of cyclopentene and 3.0 millimoles of triisobutyl aluminum to start cyclopentene polymerization, which was carried out for ca. 5 hours. 169 g of polymer were formed, corresponding to 45.9 % conversion. Trans-content of the product was 85.5%, and molar fraction of cyclooctadiene was 18.9%.

EXAMPLE 4.

80 ml (20% by volume of cyclopentene) of 1,5-cyclooctadiene was first polymerized, using a procedure similar to that of Example 1, in 800 ml of anhydrous chlorobenzene and over 1.5 millimole of tungsten catalyst until suitable degree of conversion was attained. Then, 200 ml of chlorobenzene, 400 ml of cyclopentene and 3.0 millimoles of triisobutyl aluminum were added thereto to start cyclopentene polymerization. After ca. 5 hours, 45% of monomer was converted into 169 g of polymer which contained 18.9 mole % of cyclooctadiene.

EXAMPLE 5.

In this example, 1,5,9-cyclododecatriene was used in place of 1,5-cyclooctadiene for the comonomer.

Into a nitrogen substituted reactor vessel were added 450 ml of anhydrous chlorobenzene, 3.2 millimole of tungsten catalyst and 75 ml of cyclododecatriene and the mixture was allowed to stand for a while. Then, 4.5 millimoles of aluminum bromide was added to start polymerization at room temperature, the system becoming viscous state within ca. 10 minutes, and attaining high degree of conversion. Then, 900 ml of anhydrous chlorobenzene and 300 ml of cyclopentene were added further to the mixture and the mixture was cooled to ca 0°C. Copolymerization was then carried out by starting cyclopentene polymerization triggered by addition of 6.04 millimoles of triisobutyl aluminum. After 3 hours, the polymerization was stopped by the addition of monoethyanolamine, followed by polymer recovery in the same way as in Example 1. The weight of the obtained polymer was 195 g, degree of conversion was 76.3%, and NMR analysis showed that 1,5,9-cyclododecatriene content was 32 mole %.

As for measuring the properties of vulcanisates of copolymers of these examples, tests were carried out after 30 minutes of vulcanization for the compounds described below.

Recipe of Compound

| Ingredient | Weight Part | Ingredient | Weight Part |
|---|---|---|---|
| Copolymer | 100 | Aromatic Oil | 10 |
| ISAF Carbon Black | 50 | ZnO | 3 |
| Stearic Acid | 3 | Antioxidant | 1.1 |
| Vulcanization Accelerator (CZ) | 0.6 | Sulfur | 1.8 |

Physical Properties of Pre-vulcanisates and Vulcanisates of Copolymer

| | Homopolymer | Example 1 | Example 2 | Example 3 |
|---|---|---|---|---|
| -Prevulcanisate- | | | | |
| Mooney viscosity (1) | 88 | 119 | 30 | 106 |
| Green Strength (kg/cm$^2$) | 9.2 | 36 | 23 | 37 |
| Green elongation (%) | 1183 | 808 | 1050 | 1280 |
| -Vulcanisate- | | | | |
| Tensile strength$^2$(kg/cm$^2$) | 228 | 226 | 248 | 249 |
| Elongation (%)[(2)] | 486 | 461 | 498 | 478 |
| 300% Modulus (kg/cm$^2$) (2) | 120 | 115 | 130 | 140 |
| Hardness(2) | 64 | 65 | 65 | 66 |
| Rebound (%) (2) | 60 | 62 | 62 | 66 |
| Tear strength (kg/cm$^2$)(3) | 35 | 34 | 38 | 37 |
| Goodrich heat build up T(°C) (4) | 25 | 17.5 | 16 | 12 |

Note: (1) ML-4 (100°C)
(2) JIS(Japanese Industrial Standard) K-6301
(3) Measured by JIS B-type tester
(4) Measured by Goodrich flexometer, 100°C, 55 Lb, after 25 minutes.

The foregoing description is for purposes of illustrating the principles of this invention. Numerous other variations and modifications thereof would be apparent to the worker skilled in the art. All such variations and modifications are to be considered to be within the spirit and scope of the invention.

What is claimed is:

1. Method of producing copolymer of cyclopentene, comprising the steps of
   A. polymerizing cycloolefin having more than 7 membered ring and at least two double bonds in the ring unconjugated to each other, using a catalyst comprising at least a metal compound of tungsten or molybdenum and Lewis acid; and
   B. copolymerizing the cycloolefin polymer obtained in step (A) and cyclopentene by adding into the polymerization solution of of step (A) cyclopentene and an organo metallic compound of a metal of Group I–IV of the Periodic Table.

2. Method of claim 1, wherein said cycloolefin is 1,5-cyclooctadiene or 1,5,9-cyclododecatriene and is used in an amount of 0.1 to 50 weight percent of cyclopentene.

3. Method of claim 2, wherein said amount of cycloolefin is 1 to 30 weight percent.

4. Method of claim 1, wherein said tungsten or molybdenum compound is selected from the group consisting of $WCl_3$, $WCl_5$, $WCl_4$, $WO_3$, $WO_2$, $MoCl_5$, $MoCl_3$; said Lewis acid is selected from the group consisting of $BF_3$, $AlCl_3$, $AlBr_3$, $SnCl_4$, $SiCl_4$, $TiCl_4$, and $PCl_3$; said organo metal compound is selected from the group consisting of $Al(C_2H_5)_3$, $Al(iso-bu)_3$, $(C_2H_5)_2AlCl$ and $C_2H_5AlCl_2$; wherein the molar ratio of Lewis acid to said metal compound is between 0.1/1 to 50/1; wherein the molar ratio of said organo metal compound to said metal compound is between 0.1/1 to 10/1; said metal compound being in an amount of 0.1 to 10 millimole percent based on cyclopentene; and wherein the weight ratio of cycloolefin to metal compound is between 10/1 to 0.01/1 and the molar ratio of said cycloolefin to said metal compound is between 50/1 to 10,000/1.

5. Method of claim 1, wherein said cyclopentene is copolymerized with alpha olefin or betal olefin in an amount within the range of 0.01 to 10% by weight based on cyclopentene.

6. The method of claim 1, wherein said solvent is selected from the group consisting of cyclohexane, n-hexane, toluene and chlorobenzene and polymerization in both stages is at a temperature of −60° to 70°C.

7. Copolymer of cyclopentene produced in accordance with the method of claim 1.

8. Copolymer of cyclopentene produced in accordance with the method of claim 5.

9. The method of claim 6, wherein said polymerization is at a temperature of −30° to 30°C.

10. A method of producing copolymer of cyclopentene, comprising the steps of
    A. mixing metal compound of tungsten or molybdenum and Lewis acid in chlorobenzene, the molar ratio of said metal compound to said Lewis acid being between 0.1/1 to 50/1;
    B. adding 1,5-cyclooctadiene or 1,5,9-cyclododecatriene to said mixture of step (A) in an amount of 0.1 to 10 millimole percent of cyclopentene;
    C. cooling the mixture of step (B) to about −50°C;
    D. polymerizing the mixture of step (C) and gradually raising the temperature of the mixture to about 0°C, until the mixture solution becomes viscous;
    E. adding cyclopentene to the polymerization solution of step (D) and then allowing the mixture to stand at room temperature;
    F. cooling the mixture of Step (E) to about −10°C to 0°C;
    G. adding trialkyl aluminum in an amount of the molar ratio to said metal compound of 0.1/1 to 10/1, to the polymerization solution of step (F); and
    H. recovering the resulting copolymer of cyclopentene.

* * * * *